(12) United States Patent
Weiher et al.

(10) Patent No.: US 11,749,974 B2
(45) Date of Patent: Sep. 5, 2023

(54) INTEGRAL AUTO-RACKING DEVICE FOR LOW VOLTAGE DRAW-OUT CIRCUIT BREAKERS

(71) Applicant: Utility Relay Company, Chagrin Falls, OH (US)

(72) Inventors: Helmut Weiher, Auburn Township, OH (US); Ryan J. McClarnon, Brunswick, OH (US); Joseph B. Teffner, Jr., Cortland, OH (US)

(73) Assignee: Utility Relay Company, Chagrin Falls, OH (US)

( * ) Notice: Subject to any disclaimer, the term of this patent is extended or adjusted under 35 U.S.C. 154(b) by 119 days.

(21) Appl. No.: 17/433,753

(22) PCT Filed: Apr. 7, 2021

(86) PCT No.: PCT/US2021/026125
§ 371 (c)(1),
(2) Date: Aug. 25, 2021

(87) PCT Pub. No.: WO2022/015379
PCT Pub. Date: Jan. 20, 2022

(65) Prior Publication Data
US 2022/0123533 A1   Apr. 21, 2022

Related U.S. Application Data

(60) Provisional application No. 63/052,513, filed on Jul. 16, 2020.

(51) Int. Cl.
*H02B 11/127* (2006.01)
*H02B 3/00* (2006.01)
(Continued)

(52) U.S. Cl.
CPC ............... *H02B 3/00* (2013.01); *H02B 1/34* (2013.01); *H02B 11/12* (2013.01)

(58) Field of Classification Search
CPC ...................... H02B 11/12–173; H02B 3/00
See application file for complete search history.

(56) References Cited

U.S. PATENT DOCUMENTS

| 4,101,744 | A | 7/1978 | Wilson |
| 8,304,672 | B2 | 11/2012 | Lee et al. |

(Continued)

FOREIGN PATENT DOCUMENTS

AU    2016306698 B2    2/2017

OTHER PUBLICATIONS

International Search Report for PCT/US21/26125 dated Jul. 16, 2021.
(Continued)

*Primary Examiner* — Robert J Hoffberg
(74) *Attorney, Agent, or Firm* — RatnerPrestia; Tanya S. Gaylord

(57) ABSTRACT

A circuit breaker racking system includes an electrical drive operatively connected to a mechanical racking mechanism that carries the circuit breaker and moves the circuit breaker between a connect position and a disconnect position within a cubicle, and a circuit breaker trip unit that receives remote commands and controls the electrical drive based on the remote commands. A switchgear system including at least one circuit breaker with an integrated auto-racking system is also provided.

29 Claims, 8 Drawing Sheets

(51) Int. Cl.
    *H02B 1/34*         (2006.01)
    *H02B 11/12*      (2006.01)

(56) References Cited

U.S. PATENT DOCUMENTS

| | | | |
|---|---|---|---|
| 9,570,890 B2 * | 2/2017 | Parr | H05K 7/14 |
| 10,855,106 B2 * | 12/2020 | Cochran | H02J 7/0068 |
| 2003/0200648 A1 | 10/2003 | Greer | |
| 2016/0042898 A1 | 2/2016 | Watford | |
| 2017/0287654 A1 | 10/2017 | Ashtekar et al. | |
| 2018/0205207 A1 | 7/2018 | Lagosz-Sinclair et al. | |
| 2019/0372339 A1 | 12/2019 | Burns et al. | |

OTHER PUBLICATIONS

Written Opinion of the International Searching Authority for PCT/US21/26125 dated Jul. 16, 2021.

* cited by examiner

INTEGRAL AUTO-RACKING DEVICE FOR LOW VOLTAGE DRAW-OUT CIRCUIT BREAKERS

CROSS-REFERENCE TO RELATED APPLICATIONS

This application is a National Stage of International Application No. PCT/US21/26125, filed on Apr. 7, 2021, which claims priority to U.S. Provisional Patent Application Ser. No. 63/052,513 entitled "INTEGRAL AUTO-RACKING DEVICE FOR LOW VOLTAGE DRAW-OUT CIRCUIT BREAKERS" which was filed on Jul. 16, 2020. The entireties of the aforementioned applications are herein incorporated by reference.

BACKGROUND OF THE DISCLOSURE

Field of the Disclosure

The following description relates generally to low voltage circuit breakers, and in particular to automatic racking (auto-racking) systems for draw-out low voltage circuit breakers.

Description of Related Art

Circuit breakers are used in electrical distribution systems to isolate an overloaded or faulted circuit from its power source, as well as to provide for disconnecting a circuit from its power source. An AC low voltage breaker is typically three phase, 3-pole or 4-pole or a single phase, 1-pole or 2-pole, and is used in AC electrical power distribution systems up to 1000 Volts AC. A DC low voltage breaker is typically of 1-pole or 2-pole construction and is used in DC electric power distribution systems up to 1500 Volt DC. The circuit breakers in these low voltage power distribution systems may be of either a "fixed" or "draw-out" construction. The fixed breakers are bolted in place and cannot easily be removed for testing or service.

Draw-out circuit breakers are typically housed in separate designated cubicles which are part of a switchgear assembly, also known as a switchgear line-up. Draw-out breakers are designed to be easily withdrawn from the cubicle for testing, service, or replacement. Traditionally, draw-out low voltage circuit breakers have a manually operated "racking" mechanism that levers the circuit breaker between the "connected" position and the "disconnected" position in the switchgear cubicle. Additionally, some circuit breakers may also include an intermediate "test" position.

Previously, racking mechanisms for low voltage circuit breakers were accomplished using a manually operated mechanical system. Typically, in these systems, rollers are attached to both sides of the circuit breaker and corresponding rails are attached to the inside of the cubicle which cooperate with the rollers. The circuit breaker moves horizontally with the rollers riding on the rails and is supported by the rails. In a typical manual racking system, an operator can engage a removable racking handle with a longitudinal (e.g., extending lengthwise from a front side of the circuit breaker that faces the operator toward the back of the breaker cubicle), or otherwise orientated, racking shaft and rotation of the racking handle, causes the racking mechanism to engage and move the circuit breaker either away from the connected position or towards the connected position. For manual racking systems, operating personnel are normally positioned in front of the circuit breaker with the cubicle door either open or closed (depending on the breaker/cubicle design) in order to operate the manual racking mechanism. Because of the required close proximity, operating personnel are potentially exposed and may be subjected to injury from a possible arc flash event during the manual racking operation.

Recently, temporary electrically operated auto-racking devices have been developed in order to allow operating personnel to be safely positioned outside of the arc flash hazard boundary during the racking operation. The temporary auto-racking devices generally include a motorized electrical drive that operates the mechanical racking mechanism by temporarily attaching, either magnetically or mechanically, to the front of the circuit breaker or the cubicle door and connecting with the circuit breaker's mechanical racking mechanism, in a similar fashion to the manually operated removable racking handle described above. The temporary auto-racking devices can be electrically controlled by operating personnel using a controller that has a wired, wireless, or a combination of a wired and a wireless connection to the temporarily attached auto-racking device. Using the temporary auto-racking devices, operating personnel can perform the racking operation while positioned outside of the arc flash hazard boundary. After completion of the racking operation, the temporary auto-racking device is removed from the front of the circuit breaker or the cubicle.

Temporary auto-racking devices can improve safety for operating personnel during the racking operation (compared to the manually operated racking systems), but they have several disadvantages. For example, most temporary auto-racking devices are designed to operate with only one type of circuit breaker and with only limited frame sizes of that type of particular type of circuit breaker. If multiple breaker types and frame sizes exist at a particular location, multiple temporary auto-racking devices are required for each circuit breaker type and/or frame size. Because the temporary auto-racking devices are not integral with the circuit breaker, they must be attached to, and later removed from, the circuit breaker or the cubicle door if a racking operation is required. This results in additional time necessary to perform the racking operation. The temporary auto-racking devices may be misplaced and may not be readily available when needed. In addition, the temporary auto-racking devices do not rack the circuit breaker into the test position. Importantly, the temporary auto-racking devices do not actually monitor the position of the circuit breaker, but instead rely on the force applied to the breaker's mechanical racking mechanism to determine if the breaker is in the connected position. This reliance can cause an unsafe situation for an operator who may assume that the circuit breaker is in the fully connected or disconnected position when the breaker is actually stalled somewhere in between these two positions. Further, some temporary auto-racking devices may require considerable training and periodic refresher training in order to be used properly.

It would, therefore, be desirable to provide an integral auto-racking system that integrates the automatic electro-mechanical racking system ether as a part of the circuit breaker or as a part of the circuit breaker cubicle and still allows manual operation of the racking system as an alternative.

SUMMARY

The following presents a simplified summary of the invention in order to provide a basic understanding of some example aspects of the invention. This summary is not an extensive overview of the invention. Moreover, this summary is not intended to identify critical elements of the invention or to delineate the scope of the invention. The sole purpose of the summary is to present some concepts in a simplified form as a prelude to the more detailed description that is presented later.

In one general aspect, a circuit breaker racking system comprises a mechanical racking mechanism configured to carry and move a circuit breaker between a multitude of positions within a cubicle, a motorized drive operatively connected to the mechanical racking mechanism of the circuit breaker, a drive controller configured to control a speed and a rotational direction of the motorized drive thereby controlling a movement of the circuit breaker in a racking sequence; and a circuit breaker trip unit that, in addition to its overload and fault protection duties, totally or partially assumes a function of a racking controller. The multitude of positions include a connected position and a disconnected position. The motorized drive is configured to move the circuit breaker via the mechanical racking mechanism between the multitude of positions within the cubicle.

In the system according to the foregoing aspect, the mechanical racking mechanism, the motorized drive, the drive controller, and the circuit breaker trip unit are incorporated as part of the circuit breaker.

In the system according to the foregoing aspect, the mechanical racking mechanism, the motorized drive, and the drive controller are incorporated as part of the cubicle.

In the system according to the foregoing aspect, the mechanical racking mechanism and the motorized drive are further configured to carry and move the circuit breaker to a test position within the cubicle.

In the system according to the foregoing aspect, the mechanical racking mechanism is further configured to be operated manually or by the motorized drive.

In the system according to the foregoing aspect, the motorized drive comprises one of an AC motor, a universal AC/DC motor, a stepper motor, a servo motor, or a linear motor.

In the system according to the foregoing aspect, the motorized drive comprises one of a pneumatic drive motor or a hydraulic drive motor.

The system according to the foregoing aspect, further comprising a power source for the motorized drive.

In the system according to the foregoing aspect, the power source provides electrical power, wherein the power source comprises a remote electric power source with a cable that is temporarily connected to the drive controller; from an operator control via a control link that is temporarily connected; from a cubicle control power where a secondary control circuit disconnecting means is designed to not only provide control power to the circuit breaker in the test and connect positions, but also while the circuit breaker is in the disconnected position; from a switchgear control power; from a rechargeable or non-rechargeable battery that is temporarily connected; from a rechargeable or non-rechargeable battery that is located in the circuit breaker or circuit breaker cubicle; or from power over Ethernet (PoE) via the operator control or other Ethernet network.

In the system according to the foregoing aspect, the power source provides hydraulic or pneumatic power.

The system according to the foregoing aspect, further comprising a racking position measuring device configured to provide positional information of the circuit breaker in a racking sequence.

In the system according to the foregoing aspect, the racking position measuring device comprises one of a rotary digital encoder, a rotary analog potentiometer, or a rotary linear variable differential transformer (LVDT) attached to the motorized drive or other rotating components of the mechanical racking mechanism, wherein a measured angular position is related to the circuit breaker position in the racking sequence.

In the system according to the foregoing aspect, the racking position measuring device comprises one of a digital linear motion encoder, an analog linear motion potentiometer or an analog linear motion variable differential transformer (LVDT) physically or otherwise attached between components where the measured linear motion is related to the circuit breaker position in the racking sequence.

In the system according to the foregoing aspect, the position measuring device comprises an optical or ultrasonic sensor or sensors located to determine the circuit breaker position either directly or indirectly in the racking sequence.

The system according to the foregoing aspect, further comprising an operator control device that connects to the circuit breaker trip unit with a control link, the control link comprising a wired connection, a wireless connection, or a combination of the wired and the wireless connection.

In the system according to the foregoing aspect, the control link comprises a temporary, a permanent, or a combination of a temporary and a permanent digital communications system that uses a wired or wireless connection between the operator control device and the circuit breaker racking system.

In the system according to the foregoing aspect, the function of the operator control device is incorporated as part of a Supervisory Control and Data Acquisition (SCADA) system or other Human Machine Interface (HMI) system via a communication network.

In another general aspect, a circuit breaker racking system comprises a mechanical racking mechanism configured to carry and move a circuit breaker between a multitude of positions within a cubicle; a motorized drive operatively connected to the mechanical racking mechanism of the circuit breaker; and a monitoring system configured to determine one of a condition or performance of the racking system. The motorized drive is configured to move the circuit breaker via the mechanical racking mechanism between the multitude of positions within the cubicle.

In the method according to the foregoing aspect, the racking system condition or performance monitoring is performed by a drive controller, a circuit breaker trip unit or a combination of the drive controller and circuit breaker trip unit.

In the method according to the foregoing aspect, the determining of the racking system condition or performance comprises monitoring a force required to move the circuit breaker along circuit breaker rails and a force required to seat and unseat main finger clusters from main finger clusters stabs.

In the method according to the foregoing aspect, racking system operational parameters comprising the force required to move the circuit breaker along circuit breaker rails and the force required to seat and unseat the main finger clusters from the main finger clusters stabs are not directly measured but are inferred by other parameter measurements including temperatures, voltages, currents, hydraulic pressures, pneumatic pressures, torque, or flow rates.

In the method according to the foregoing aspect, the drive controller or the circuit breaker trip unit includes settings for normal racking system performance values and tolerances, wherein the normal racking system performance values are predetermined based on previous racking operations or programed by an operator.

In the method according to the foregoing aspect, the monitoring system is configured to determine one of a condition or performance of the racking system further comprising out of tolerance alarms for operational performance of said racking system.

In the method according to the foregoing aspect, the out of tolerance alarms are audibly or visually annunciated to operating personnel via at least one of operator controls, the drive controller, a circuit breaker trip unit, or are transmitted to a remote device over a communication network.

In the method according to the foregoing aspect, at least some of the out of tolerance alarms are adapted to be configured by an operator or programmed to automatically trigger an abortion of a racking operation or the racking of the circuit breaker to a safe position, wherein the safe position is one of a test position or a disconnected position.

In the method according to the foregoing aspect, an out of tolerance alarm during a racking operation is adapted to be configured by an operator or programmed to cause racking controls to enter a lock-out state where further racking commands are blocked until the lock-out state is cancelled by a secured or unsecured lock-out cancel command.

In the method according to the foregoing aspect, various racking events are logged, wherein the logged racking events comprise: racking operation type, change in alarm status, lock-out operation, racking drive values, and time and date stamps, and the logging of events occurs in at least one device comprising the operator control, the drive controller, or the circuit breaker trip unit, or by remote devices.

In the method according to the foregoing aspect, racking event data is transmitted to at least one remote device over a communications network medium, wherein the communication network medium comprises a wired connection, a wireless RF connection, or non-RF wireless connection with a protocol appropriate to the communication network medium.

In the method according to the foregoing aspect, the wired connection comprises Ethernet, RS485, RS232 or USB, the wireless RF connection comprises Bluetooth or ZigBee, and the non-RF wireless connection comprises an infrared or visible light communication protocol.

In the method according to the foregoing aspect, information provided to an operator and to other devices is an open or closed status of the circuit breaker which is configured to be logged and transmitted to the other devices comprising the operator control, the drive controller, the circuit breaker trip unit or to remote devices.

BRIEF DESCRIPTION OF THE DRAWINGS

The foregoing and other aspects of the present disclosure will become apparent to those skilled in the art to which the present disclosure relates upon reading the following description with reference to the accompanying drawings, in which.

DETAILED DESCRIPTION

Figure 1:
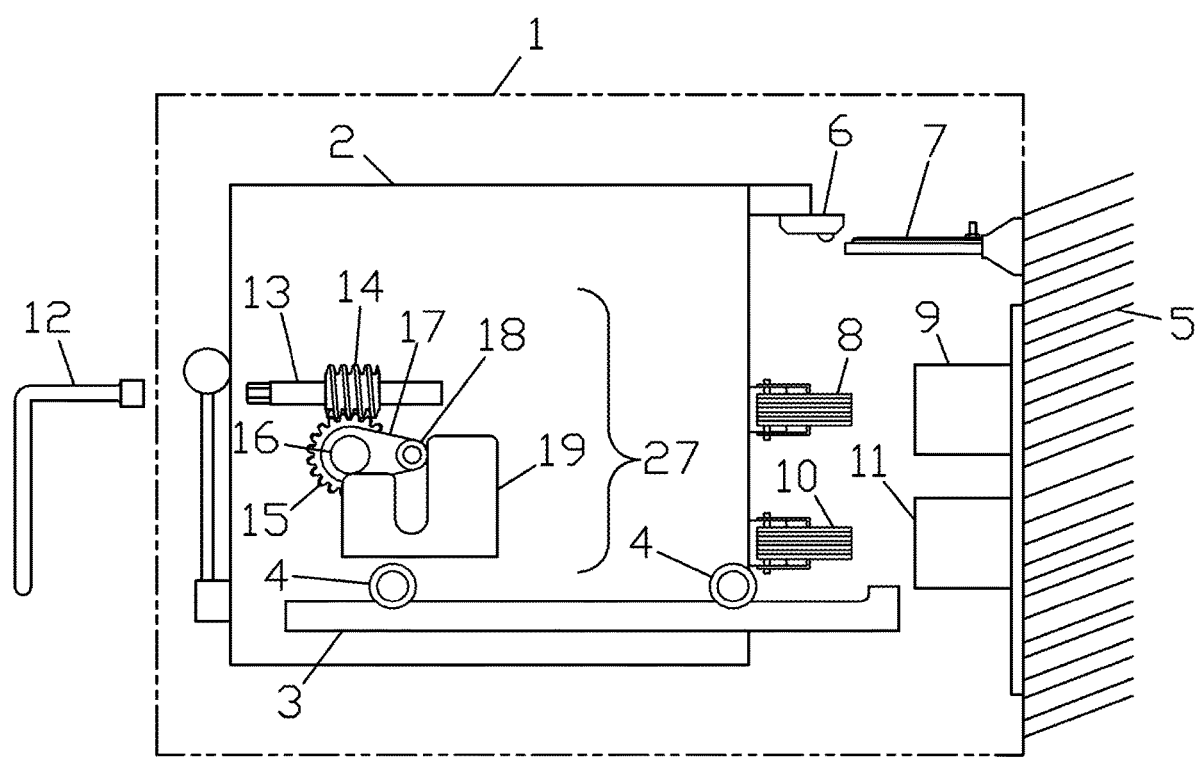
FIG. 1 is a simplified schematic diagram of the breaker mounted manual only racking system on a typical circuit breaker (with some components omitted for clarity) and in a disconnected position.

The present disclosure will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present disclosure. It may be evident, however, that the present disclosure can be practiced without these specific details. Additionally, other embodiments of the present disclosure are possible, and the present disclosure is capable of being practiced and carried out in ways other than as described. The terminology and phraseology used in describing the present disclosure is employed for the purpose of promoting an understanding of the disclosed embodiments and should not be taken as limiting.

Example embodiments of the present disclosure relate to an integral auto-racking system that integrates the auto-racking system either as part of the circuit breaker (breaker-integrated) or as part of the circuit breaker cubicle (cubicle-integrated) as opposed to temporary auto-racking mechanisms that are not an integral part of the circuit breaker or cubicle.

Typically, circuit breakers have support rollers attached on both of their sides that ride on corresponding rails attached to the cubicle. The circuit breakers are supported by, and move along, these rails within the cubicle allowing the circuit breaker to be moved between the various racking positions.

For example, as illustrated in FIG. 1, stationary rails 3 are mounted on both sides of the breaker cubicle 1. Support rollers 4 are attached to both sides of the circuit breaker 2. The circuit breaker 2 is supported by the stationary rails 3 via the support rollers 4 and moves horizontally with the support rollers 4 riding on the stationary rails 3.

The circuit breaker cubicle 1 (which is part of the switchgear 5) contains the primary circuit line and load connection points for the circuit breaker 2. Finger clusters 8 and 10 are used to make the breaker-to-line and breaker-to-load circuit connections. The cubicle 1 also contains the secondary connection points for the breaker controls.

In the disconnected position (as shown in FIG. 1), a breaker side 6 of a secondary control circuit disconnecting means is disconnected from a stationary cubicle side 7 of the secondary control circuit disconnecting means. The line side breaker-mounted primary circuit finger clusters 8 (typically three for a 3-pole circuit breaker or four for a 4-pole circuit breaker) are disconnected from the corresponding stationary cubicle line side stabs 9. The stationary cubicle line side stabs 9 are connected to a power source (not shown in FIG. 1). Load side breaker-mounted primary circuit finger clusters 10 are disconnected from the stationary cubicle load side stabs 11. The stationary cubicle load side stabs 11 are connected to a load (not shown in FIG. 1) which is intended to be supplied by the power source.

Figure 2:
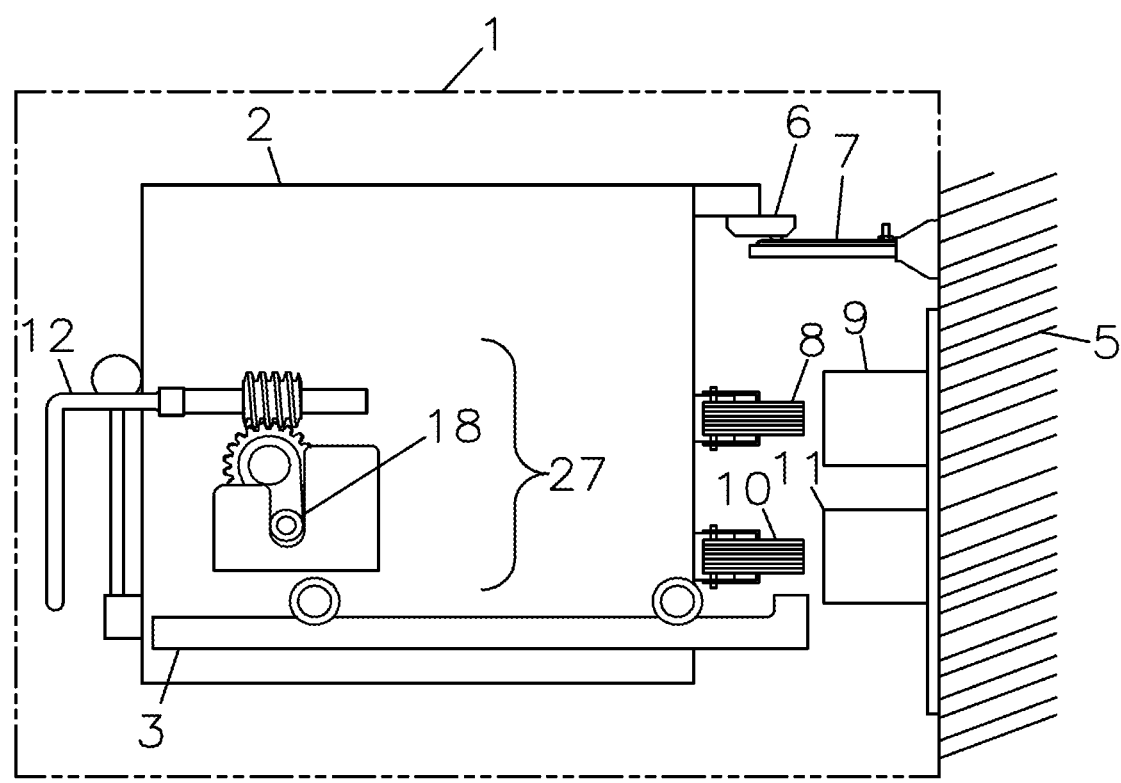
FIG. 2 is a simplified schematic diagram of the breaker mounted manual only racking system on a typical circuit breaker (with some components omitted for clarity) and in a test position.

In the test position (shown in FIG. 2), the circuit breaker 2 was moved along the stationary rails 3 by the rotation of the racking handle 12 by the operator and the action of the mechanical racking mechanism 27, so that the breaker side 6 and the cubicle side 7 of the secondary control circuit disconnecting means are connected. However, the line side and the load side breaker primary finger clusters 8 and 10 are not connected to the line side and the load side stabs 9 and 11, respectively. An electrically operated circuit breaker can be operated in this position without energizing the primary side load.

Figure 3:
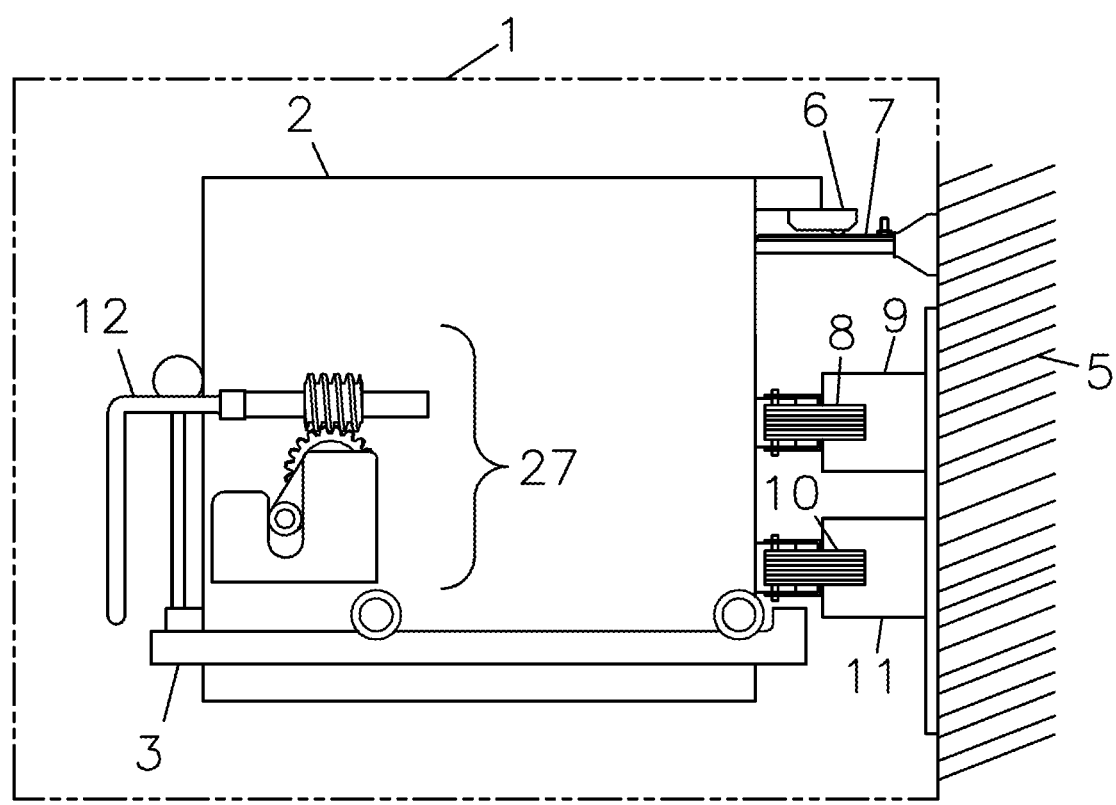
FIG. 3 is a simplified schematic diagram of the breaker mounted manual only racking system on a typical circuit breaker (with some components omitted for clarity) and in a connected position.

In the connected position (shown in FIG. 3), the circuit breaker 2 was further moved along the stationary rails 3 by the rotation of the racking handle 12 by the operator and the action of the racking mechanism 27. In the connected position, the circuit breaker 2 is fully functional. The circuit breaker side 6 and the cubicle side 7 of the secondary control circuit disconnecting means are connected. Line side breaker-mounted primary circuit finger clusters 8 are connected to the stationary cubicle line side stabs 9. Load side breaker-mounted primary circuit finger clusters 10 are connected to the stationary cubicle load side stabs 11 and, if the circuit breaker 2 is closed, power is delivered from the source to the load.

The mechanical racking mechanism 27 can operate by using different mechanical principles. As one example, as shown in FIG. 1, a racking shaft 16 is located horizontally in the breaker and orthogonally to the direction of the racking motion. The racking shaft 16 is rotated by the actions of the worm 14 and the worm gear 15 which is attached to the racking shaft 16. The worm 14 is attached to racking shaft 13 which can be rotated by connecting racking handle 12 to racking shaft 13. Attached to the ends of the racking shaft 16 are racking arms 17 with racking rollers 18 at the ends of the arms. The rotation of the racking shaft 16 causes the racking rollers 18 to move in a circular path, which is a combination of horizontal and vertical motion. These racking rollers 18 key into stationary brackets 19 firmly attached to the sides of the cubicle 1. The stationary brackets 19 include a vertical slot to accommodate the vertical motion of the racking rollers 18 on the racking arms 17 when the racking shaft 13 is rotated. The horizontal motion of the racking rollers 18 on the racking arms 17 when the racking shaft 13 is rotated, translates into the desired horizontal motion of the breaker 2 relative to the breaker cubicle 1. As described, by engaging the removable racking handle 12 with the longitudinal racking shaft 13 and rotating the handle 12 with a proper rotation, an operator can cause the racking mechanism to engage and move the circuit breaker 2 away from or towards the disconnected position.

Figure 7:
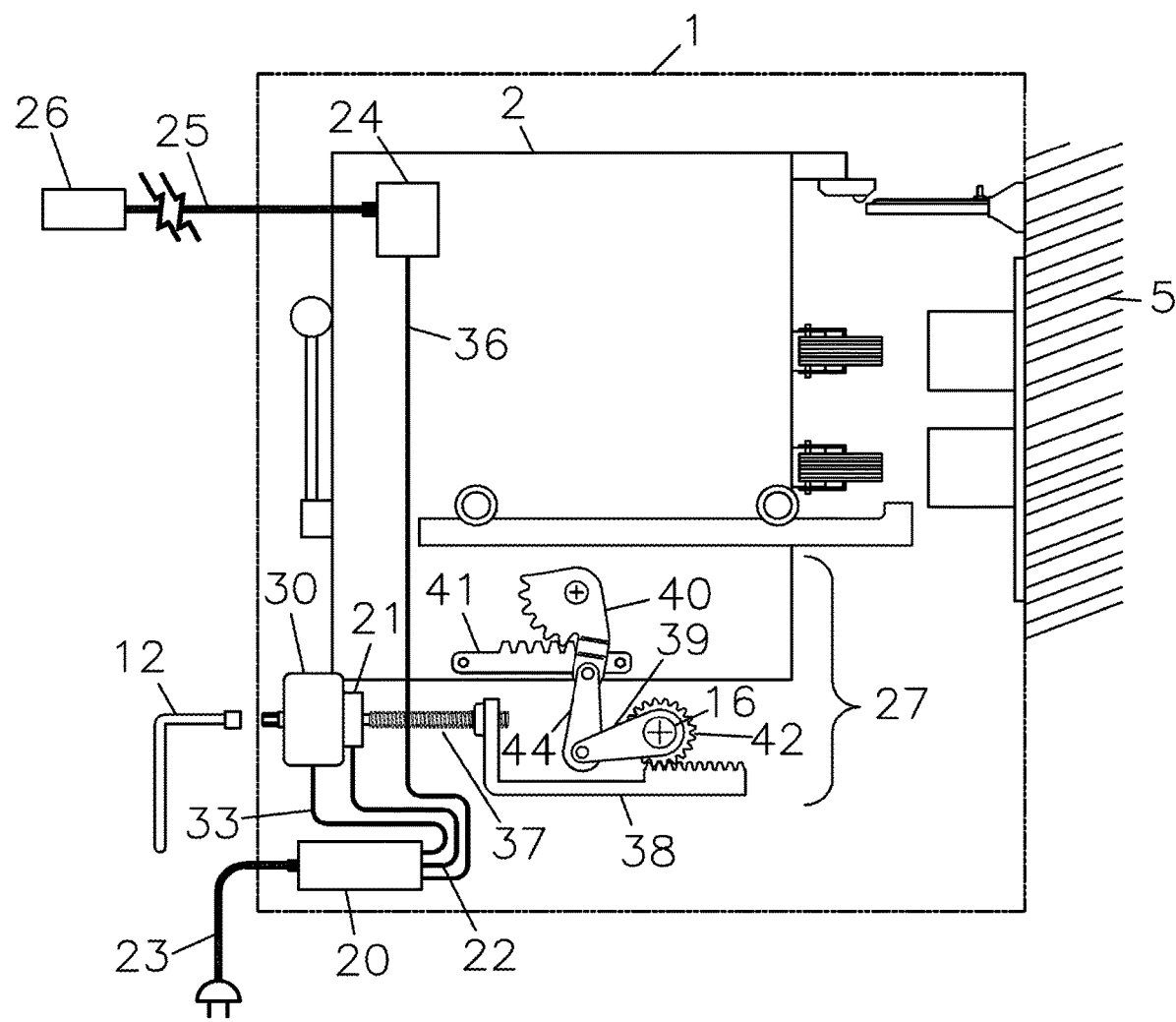
FIG. 7 is a schematic diagram of one possible way to implement the combination manual and cubicle-integrated auto-racking system of FIG. 6, according to an embodiment and shown in the disconnected position.
Figure 8:
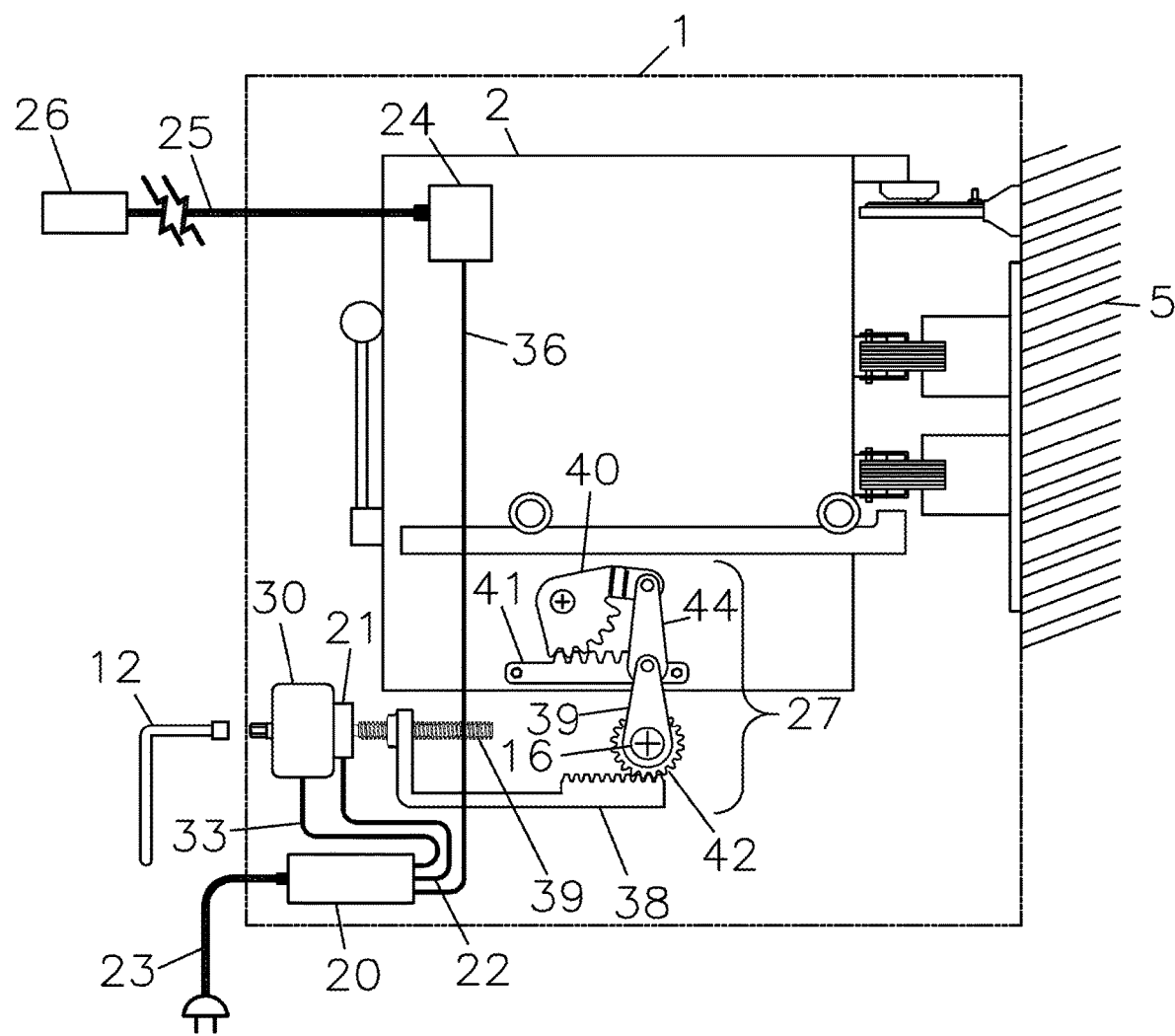
FIG. 8 is a schematic diagram of one possible way to implement the combination manual and cubical-integrated auto-racking system of FIG. 6, according to an embodiment and shown in the connected position.

Another example of a possible mechanical racking mechanism 27 is illustrated in FIGS. 7 and 8. In this example the rotation of racking screw 37 in a clockwise or counter-clockwise direction causes the follower nut, which is part of linear gear rack 38, to move the linear gear rack 38 in a forward or backward direction. The linear motion of the linear gear rack 38 results in the rotation of the cubicle mounted rack gear 42 which is attached to and rotates a fixed shaft 16 causing movement of links 39 and 44 and thereby rotation of cubicle mounted rack gear 40 which is attached to and rotates its cubicle mounted fixed shaft. Cubicle mounted rack gear 40 meshes with circuit breaker mounted gear rack 41 causing the breaker to move towards or away from the connected position.

Figure 4:
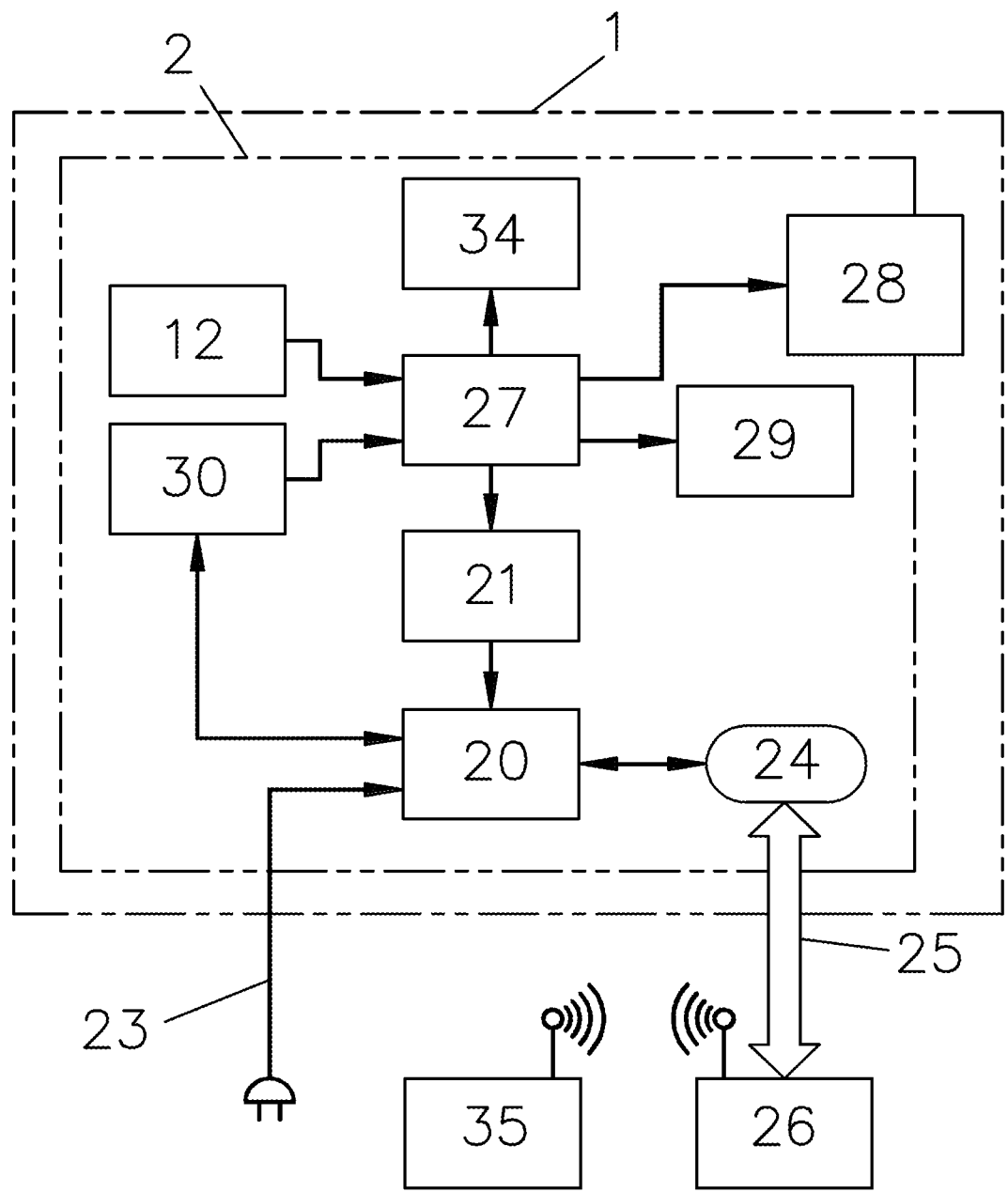
FIG. 4 is a block diagram of a combination manual racking system and integral auto-racking system that is part of the circuit breaker (breaker-integrated), according to an embodiment.

Mechanical racking systems inherently need an interface between the circuit breaker and its cubicle in order for the racking mechanism to move the circuit breaker relative to the cubicle. In FIGS. 1, 2, 3 and 5 this interface is between the racking roller 18 and the racking bracket 19. In FIGS. 7 and 8 this interface is between the cubicle mounted rack segment 40 and the breaker mounted gear rack 41. In FIGS. 4 and 6 this interface is represented by the block 28.

The foregoing example implementations of the mechanical racking mechanism 27 shown in FIGS. 1, 2, 3, 5, 7 and 8 are not limiting. Many other mechanical racking methods can be devised by someone mechanically skilled to accomplish the goal of translating a rotary motion into a linear motion that moves a circuit breaker in the racking direction.

FIG. 4 is a block diagram of a combination manual racking system and a breaker-integrated auto-racking system. FIG. 6 is a block diagram of a combination manual racking system and a cubicle-integrated auto-racking system. As illustrated in FIGS. 4 and 6, the mechanical racking mechanism 27 can be operated by either the manual racking handle 12 or by the motorized drive 30. The mechanical racking mechanism 27 is also coupled to other devices consisting of a visual breaker position indicator 34, a mechanical breaker to cubicle interface 28, and a safety breaker tripping mechanism 29. The safety breaker tripping mechanism 29 is configured to prevent moving a circuit breaker that is closed into or out of the disconnected, test, or connected positions (safety breaker tripping mechanism 29 is not shown in FIG. 1, 2, 3, 5, 7 or 8).

The block diagrams of auto-racking systems shown in FIGS. 4 and 6 further includes a motorized drive 30 which is connected to the mechanical racking mechanism 27 in such a manner that the mechanical racking mechanism 27 can move the circuit breaker 2 from the disconnected position to the connected position via operation of the motorized drive 30. The motorized drive 30 can also be reversed to move the circuit breaker 2 from the connected position to the disconnected position. Additionally, if the circuit breaker 2 has a test position, the motorized drive 30 can move the circuit breaker 2 into or out of the test position. During a racking operation, the rotational velocity and rotational direction of motorized drive 30 is monitored and controlled by the mutual actions of the drive control 20 and the circuit breaker trip unit 24 in order to control the racking speed and direction of the circuit breaker 2.

It is understood that although the auto-racking figures and the descriptions in this application reflect an electrically based motorized drive 30, this drive can also function equally well using pneumatic or hydraulic principles where a hydraulic pressure or pneumatic pressure causes a hydraulic or a pneumatic motorized drive to operate. If the motorized drive is electrical, it can for example be an AC motor, a brushed or brushless DC motor, a universal AC/DC motor, a linear motor, a stepper motor, servo motor or a motor of some other design that converts electrical energy into rotary motion or linear motion. A gearing mechanism can also be included between the motorized drive 30 and the mechanical racking mechanism 27.

In addition to the motorized drive 30, the mechanical racking mechanism 27 can also include a manual racking handle 12, which can provide a manual method of operation for testing purposes or in the event of an emergency. An operator can use the racking handle 12 to engage the racking mechanism and, with energy supplied by the operator, move the circuit breaker 2 from, or to, the various breaker racking positions. A necessary element for this procedure is a visual breaker position indicator 34 that can be arranged such that the operator can observe the indicator 34 to determine the position of the circuit breaker 2 in the cubicle 1. The visual breaker position indicator 34 can be driven by the mechanical racking mechanism 27.

As indicated in FIGS. 4 and 6, the circuit breaker trip unit 24 is the centralized auto-racking control device and implements the auto-racking control logic as initiated by the operator control 26. In its auto-racking control duty, the circuit breaker trip unit 24 sends operational commands to the drive control 20 and also receives auto-racking status data from the drive control 20 via the drive control link 36 (shown in FIG. 5). This auto-racking control duty provided by the circuit breaker trip unit 24 is in addition to its other duty of providing overload and fault protection for the load and conductors supplying the load by the circuit breaker 2.

Figure 5:
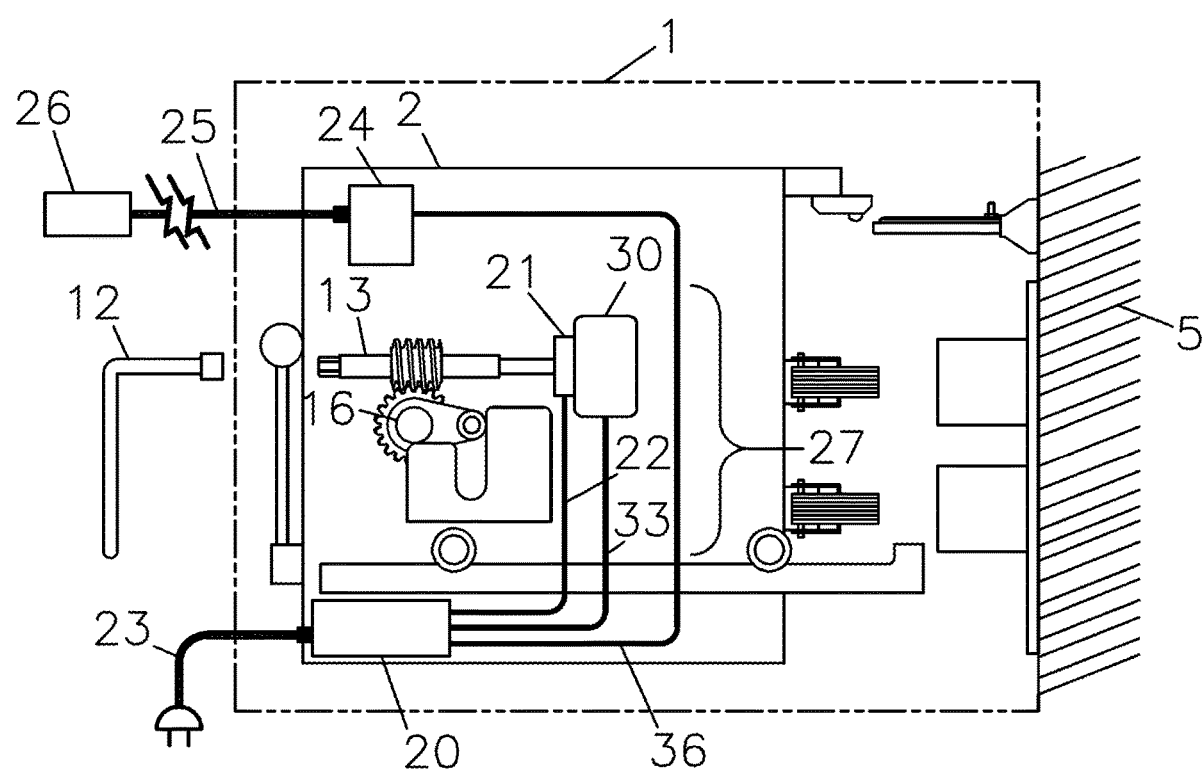
FIG. 5 is a schematic diagram of one possible way to implement the combination manual racking system and breaker-integrated auto-racking system of FIG. 4, according to an embodiment.
Figure 6:
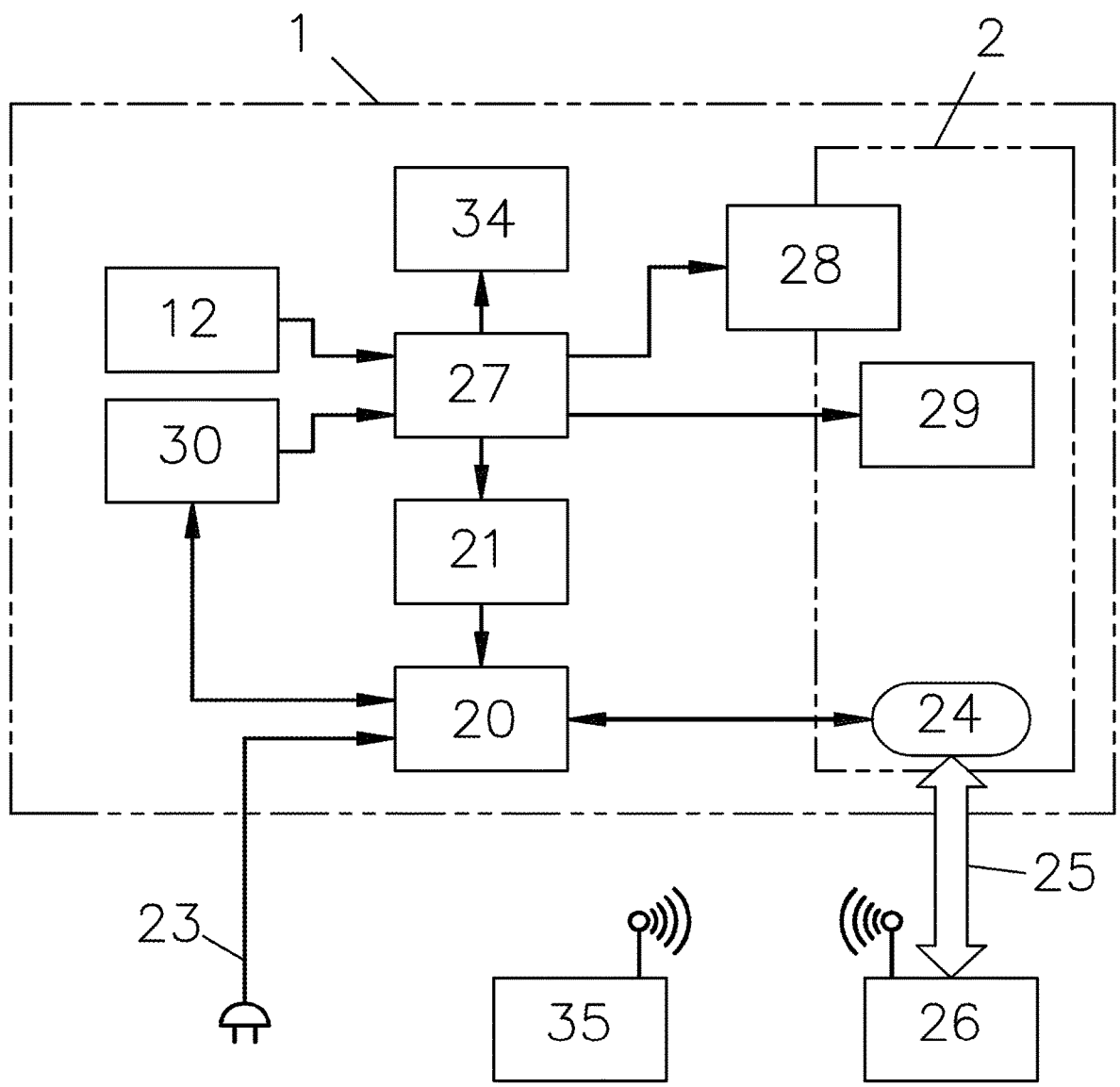
FIG. 6 is a block diagram of a combination manual racking system and integral auto-racking system that is part of the cubicle (cubicle-integrated), according to an embodiment.

Also, as indicated in FIGS. 4 and 6, the drive control 20 receives racking power 23 from a power source and in turn provides power to the motorized drive 30 via a drive motor cable 33 (shown in FIG. 5). The drive control 20 can also measure the energy consumption of the motorized drive 30 and receive circuit breaker position information from the encoder 21.

FIG. 5 is a schematic diagram of one possible way to implement the combination manual and breaker-integrated auto-racking system of FIG. 4. In this figure an auto-racking motorized drive 30 is connected to a longitudinal racking shaft 13. The motorized drive 30 rotates the racking shaft 13 in a clockwise or a counterclockwise direction, as directed by the circuit breaker trip unit 24 via the electrical drive control 20. This configuration still allows manual breaker racking, as a back-up method, by using a removable racking handle 12, for example, to rotate the racking shaft 13.

FIGS. 7 and 8 are schematic diagrams of one possible way to implement the cubicle-integrated auto-racking system of FIG. 6. The configurations shown in these figures are the inverse of the breaker-integrated auto-racking system shown in FIG. 5. The cubical-integrated auto-racking mechanism is located in the cubicle and is part of the cubicle.

In the auto-racking implementation of FIGS. 7 and 8 a motorized drive 30 is connected to a longitudinal racking screw 37 and rotates the racking screw 37 in a clockwise or counterclockwise direction. The follower nut, which is part of linear gear rack 38, moves the linear gear rack 38 in a forward or backward direction based on the rotational direction of motorized drive 30. The motorized drive 30 is controlled by drive controller 20 based on direction from the circuit breaker trip unit 24. This configuration still allows manual breaker racking, as a back-up, using a removable racking handle 12, for example, to rotate racking screw 37.

As illustrated in FIGS. 7 and 8, linear motion of the linear gear rack 38 results in linear motion of the breaker 2 via the rotation of the cubicle mounted rack gear 42 which is attached to shaft 16 thereby also causing it to rotate. Link 39 is also attached to shaft 16 whereby rotation of shaft 16 causes movement of links 39 and 44, and thereby rotation of cubicle mounted rack gear 40 which is attached to and rotates its cubicle mounted fixed shaft. Cubicle mounted rack gear 40 meshes with circuit breaker mounted gear rack 41 causing the breaker to move either towards or away from the connected position. FIG. 7 illustrates the cubicle-integrated auto-racking mechanism in the breaker disconnected position and FIG. 8 illustrates the cubicle-integrated auto-racking mechanism in the breaker connected position.

In the embodiments illustrated in FIGS. 4 through 8, if a breaker racking operation is desired, the operator can temporarily connect the operator control 26 to the circuit breaker trip unit 24 using the operator control link 25 and also provide power to drive control 20 by connecting racking power 23. The operator can then move to a position outside of the arc flash hazard boundary and can initiate the breaker racking operation using the operator control 26. After the racking operation is complete, the operator can disconnect the operator control 26 from the circuit breaker trip unit 24 and also remove the racking power 23 from the drive control 20.

The control link 25 may be a wired connection (as shown in FIGS. 5, 7 and 8), a wireless connection, or a combination of wired and wireless connection.

The circuit breaker trip unit 24 is further connected to the drive control 20 with drive link 36 which transfers data between the two devices during a racking operation.

As further illustrated in FIGS. 4 through 8, a rotary encoder 21 provides angular position information to the drive control 20 via encoder cable 22. This angular position relates directly to the position of the circuit breaker 2 in the racking sequence. This angular position is relayed by the drive control 20 to the circuit breaker trip unit 24 for its use in implementing the auto-racking logic. The encoder 21 can be mounted on the motorized drive 30, as shown in FIGS. 5, 7 and 8, for example. Alternatively, the encoder 21 can be arranged on different parts of the auto-racking mechanism, such as on a transverse racking shaft 16 (not shown so mounted in the figures), for example.

The breaker position measuring device 21 can provide the position information with either digital signals or analog signals. If providing digital signals, the breaker position measuring device 21 can be an absolute or incremental rotary digital encoder or a digital linear motion encoder. If providing analog signals, the breaker position measuring device 21 can be a rotary analog potentiometer, an analog linear motion potentiometer, a rotary or an analog linear variable differential transformer (LVDT), or sensors operating based on a variety of other technologies. Optical and ultrasonic sensors can also be used to determine the positional relationship of the circuit breaker to the cubicle.

The electrical drive control 20 and the circuit breaker trip unit 24 can include one or more of a microprocessor, a microcontroller that includes a central processing unit (CPU), a memory, an input/output interface, a digital signal processor (DSP), an application specific integrated circuit (ASIC), a field-programmable gate array (FPGA), discrete logic circuitry, or the like. The circuit breaker trip unit 24 can further include at least one timer that keeps track of, or counts, various time intervals. The memory of the circuit breaker trip unit 24 may store program instructions that, when executed by the electrical drive control 20, cause the auto-racking system to provide the functionality ascribed to it herein. The memory may also store different reference racking operation parameters, reference racking operation parameter tolerances, racking log including time and date stamp, etc., as described below. The memory may include one or more volatile, non-volatile, magnetic, optical, or electrical media, such as read-only memory (ROM), random access memory (RAM), electrically-erasable programmable ROM (EEPROM), flash memory, or the like. The circuit breaker trip unit 24 and the electrical drive control 20 can further include one or more analog-to-digital (ND) converters for processing various analog inputs and digital-to-analog (D/A) converters for outputting various analog signals. In addition to its drive control duties, the circuit breaker trip unit 24 can also act as an interface for data required by the operator control 26.

In its simplest form, the circuit breaker trip unit 24 can receive commands from the operator control 26. These commands can include but are not limited to:
 a. Move the circuit breaker forward and towards the connected position.
 b. Move the circuit breaker in reverse and away from the connected position.

In its simplest form, the breaker circuit trip unit 24 can also forward data signals to the operator control 26. These data signals can include but are not limited to:
 a. Circuit breaker position in the cubicle.
 b. Status of limit switches.
 c. Power consumption of the motorized drive 30.
 d. Temperature of the motorized drive 30.
 e. Control voltage reading.

In its more complete form, the circuit breaker trip unit 24 can receive upper-level commands from the operator control 26 and can provide diagnostic information related to the condition of the breaker racking system to the operator control 26. These upper-level commands can include but are not limited to:
 a. Move circuit breaker from one racking position to another racking position in the cubicle.
 b. Save or overwrite in a memory, reference racking operation parameters.
 c. Save or overwrite in a memory, reference racking operation parameter tolerances.
 d. Save, in a memory, racking information and update racking log including time and date stamp.

In its more complete form, the circuit breaker trip unit 24 can also forward racking information to the operator control 26. This racking information can include but is not limited to:
 a. Successful completion of a circuit breaker racking move operation in the cubicle.
 b. Position of the circuit breaker in the cubicle.
 c. Open/close status of the circuit breaker.
 d. Status of alarms including but not limited to motorized drive 30 overload, motorized drive 30 overtemperature, stuck circuit breaker, etc.

In its more complete form, the circuit breaker trip unit 24 can also forward to the operator control 26 information related the condition of the breaker racking system. This information can include but is not limited to:
 a. Average and maximum force required to move the circuit breaker along its rails during the racking operation.
 b. Average and maximum force required to seat the main fingers onto the stabs during the racking operation.
 c. Racking log.

The racking force information can be in various forms, such as motorized drive 30 torque, motorized drive 30 current or voltage if electric, or various forces applied to the circuit breaker, or other measurable parameters that are relatable to racking force such as temperatures, hydraulic pressures, pneumatic pressures, or flow rates, for example.

The control of the integral auto-racking operation can be accomplished in the following ways or in combinations of the following ways:

Firstly, the operator control 26 can include a control link 25 consisting of a cable which is plugged directly into the circuit breaker trip unit 24 or into a port in the front of the circuit breaker cubicle door which in turn connects to the circuit breaker trip unit 24. The control link 25 cable is preferably of sufficient length to allow the operator and the operator control 26 to be stationed outside of the arc flash hazard boundary during the racking operation. The operator control 26 can send signals to the circuit breaker trip unit 24 via the control link 25 to control the integral auto-racking operation. The control link 25 signals can consist of digital communications that use an Ethernet or USB protocol, for example, or discrete electrical signals, such as ladder logic type control, for example. The control link 25 can also consist of digital communications over an optical fiber.

Secondly, the operator control 26 can include a control link 25 consisting of a cable which is plugged directly into the circuit breaker trip unit 24 or into a port in the front of the circuit breaker cubicle door which in turn connects to the circuit breaker trip unit 24. The control link 25 cable may or may not be of sufficient length to allow the operator and the operator control 26 to be stationed outside of the arc flash hazard boundary. A separate wireless controller 35 can communicate with the operator control 26 allowing the operator to be stationed outside of the arc flash hazard boundary during the racking operation. The wireless controller 35 can signal the operator control 26 to send signals to the circuit breaker trip unit 24 as if the operator were using the operator control 26 directly.

Thirdly, the operator control 26 can include a control link 25 which is a wireless link that communicates with the circuit breaker trip unit 24. The control link 25 can be a wireless RF connection such as Wi-Fi, Bluetooth, or ZigBee, for example, or non-RF connection, such as infrared or visible light, for example.

Fourthly, the operator control 26 may exist, not as a separate entity, but as part of a Supervisory Control and Data Acquisition (SCADA) system or a Human-Machine Interface (HMI) system that communicates with the circuit breaker trip unit 24 over a wired network such as RS485 or Ethernet as examples or a wireless network such as Wi-Fi or Bluetooth as examples.

If the motorized drive 30 is electrical, a source of electrical power is required to operate the integral auto-racking system illustrated in FIGS. 4 through 8. Electrical auto-racking control power 23 can be provided in multiple ways:
 a. From a remote source with a cable that is temporarily connected to the circuit breaker as illustrated in FIGS. 4 through 8.
 b. From the operator control 26 with the control link 25 cable that is temporarily connected to the circuit breaker.
 c. From the cubicle control power where the secondary control circuit disconnecting connector is designed to not only provide control power to the circuit breaker in the test and connect positions, but also while the circuit breaker is in the disconnected position. The remaining secondary control circuits would only connect to the circuit breaker in the test and connected positions.
 d. From the switchgear control power where a flexible cable is used to connect the control power 23 to the circuit breaker while the circuit breaker is in the disconnect position and throughout the breaker movement.
e. From a rechargeable or non-rechargeable battery that is temporarily connected to the circuit breaker.
f. From a rechargeable or non-rechargeable battery that is located in the circuit breaker 2 or the cubicle 1. The rechargeable battery can be charged in location with a charge controller powered by circuit breaker control power or by temporarily connected charging power. The rechargeable battery can also be designed to be temporarily removed to be charged by an external device. The non-rechargeable battery can be replaced as needed.
g. From power over Ethernet (PoE) from the operator control 26.

Breaker Racking Condition Diagnostics

Traditionally, with purely mechanical racking systems, it was not possible to determine the condition of the circuit breaker racking system without a detailed examination requiring a shutdown. The only non-invasive indication of issues in the racking system could be provided by the perceptions of a skilled operator during a racking operation.

With the use of an integral auto-racking system, the racking system can include self-monitoring configured to determine the condition or performance of the racking system. The monitoring system self-monitors the racking operation, compares the racking operation parameters with saved, in a memory, reference racking operation parameters, and alarms any deviation from the reference racking operation parameters with out of tolerance alarms (e.g., plus or minus a predefined tolerance from the reference racking operation parameters) Therefore, the normal racking system reference performance values can be automatically predetermined by the auto-racking system based on previous racking operations or programed by an operator based on previous racking operation parameters and saved in a memory along with the associated tolerances.

An out of tolerance alarm can be audibly or visually annunciated via many devices including but not limited to at least one of operator controls 26 or 35, the drive controller 20, a circuit breaker trip unit 25, or are transmitted to a remote device such as a SCADA system or an HMI system over a communications network.

Furthermore, in addition to annunciating an out of tolerance alarm, the auto-racking monitoring system can be configured to perform additional actions such as; (a) automatically cause the auto-racking system to trigger an abortion of the racking operation where the auto-racking operation is stopped and the circuit breaker is left in whatever racking position it was in when the alarm occurred and intervention is required by an operator; (b) or cause a lock-out state in the auto-racking operation where the auto-racking operation is stopped and further racking commands are blocked until the lock-out state is cancelled by a secured or unsecured lock-out cancel command entered by an operator; (c) or cause the auto-racking system to automatically rack the circuit breaker to a safe position such as the test position or the disconnected position.

As an example of deviations from the reference racking operation parameters, the force required to seat the main finger clusters onto the stabs may be higher or lower than the reference value. If the seating force is greater than the reference force, it could indicate misaligned finger clusters that did not properly mate with the stabs or it could indicate a lack of lubrication of the finger clusters. If the seating force is lower than the reference force, it could indicate a missing finger cluster(s) or that poor contact pressure exists between the finger clusters and stabs. These are all dangerous situations.

The racking operation parameters can include but are not limited to the following:
a. Circuit breaker serial number or another identifier.
b. Average and maximum force required to move the circuit breaker along the cubicle rails.
c. Average and maximum force required to seat the main finger clusters onto the stabs.
d. Reference force required to move the circuit breaker along the cubicle rails.
e. Reference force required to seat the main fingers onto the stabs.
f. Plus/minus tolerances for each force measurement.
g. Number of breaker racking operations since last reset.
h. Time and date stamp of each racking operation.
i. Time and date stamp of racking operations that deviate from the saved reference racking operation parameters.
j. Auto-racking operation type including but not limited to; rack in to test position, rack in to connected position, rack out to test position, rack out to disconnected position, abort auto-racking operation, auto-racking lock-out, auto-racking lock-out cancel, auto-racking operation to safe test position, and auto-racking operation to safe disconnected position.

The racking operation parameters can be stored in a memory in the circuit breaker trip unit 24, the drive control 20 or in the operator control 26 and linked to the circuit breaker by a unique identifier.

There are multiple advantages of the above-described implementations of the cubicle-integrated and the breaker-integrated auto-racking systems. Because the integral auto-racking system is incorporated into the circuit breaker or the cubicle, no complicated attachment and removal of a temporary auto-racking device is required, which greatly simplifies the racking operation and greatly reduces operator training requirements.

Because the breaker-integrated or the cubicle-integrated auto-racking system is incorporated into the circuit breaker 2 or the cubicle 1, it can determine the exact position of the circuit breaker 2 in relation to the cubicle 1 during the racking operation. For example, the circuit breaker trip unit 24 in combination with the operator control 26 can signal the operator when the circuit breaker 2 is in the fully racked in (i.e., connected) position, the test position, or the disconnected position. If the circuit breaker 2 is stalled in between positions, the circuit breaker trip unit 24 in combination with the operator controls 26 can inform the operator of a potentially dangerous situation.

The circuit breaker trip unit 24 in combination with the operator control 26 can also signal an operator about other racking issues that may occur, such as an increase in normal racking force due to mechanical binding or additional friction in the racking mechanism or problems in the primary finger clusters, for example.

It should be evident that this disclosure is by way of example and that various changes may be made by adding, modifying, or eliminating details without departing from the fair scope of the teaching contained in this disclosure. The disclosure is therefore not limited to particular details of this disclosure except to the extent that the following claims are necessarily so limited. Many other example embodiments can be provided through various combinations of the above-described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be desirable to adapt the embodiments to a particular situation or to particular needs without departing from the intended scope of the application. It is intended that the application is not limited to the particular example implementations and example embodiments described herein, but that the claims be given their broadest reasonable interpretation to cover all novel and non-obvious embodiments, literal or equivalent, disclosed or not, covered thereby.

What is claimed is:

1. A circuit breaker racking system, comprising:
a mechanical racking mechanism configured to carry and move a circuit breaker between a multitude of positions within a cubicle, the multitude of positions comprising a connected position and a disconnected position;
a motorized drive operatively connected to the mechanical racking mechanism of the circuit breaker, the motorized drive being configured to move the circuit breaker via the mechanical racking mechanism between the multitude of positions within the cubicle;
a drive controller configured to control a speed and a rotational direction of the motorized drive thereby controlling a movement of the circuit breaker in a racking sequence; and
a circuit breaker trip unit wherein in addition to its overload and fault protection duties, totally or partially controls the drive controller and assumes a function of a racking controller.

2. The circuit breaker racking system of claim 1, wherein the mechanical racking mechanism, the motorized drive, the drive controller, and the circuit breaker trip unit are incorporated as part of the circuit breaker.

3. The circuit breaker racking system of claim 1, wherein the mechanical racking mechanism, the motorized drive, and the drive controller are incorporated as part of the cubicle.

4. The circuit breaker racking system of claim 1, wherein the mechanical racking mechanism and the motorized drive are further configured to carry and move the circuit breaker to a test position within the cubicle.

5. The circuit breaker racking system of claim 1, wherein the mechanical racking mechanism is further configured to be operated manually or by the motorized drive.

6. The circuit breaker racking system of claim 1, wherein the motorized drive comprises one of an AC motor, a universal AC/DC motor, a stepper motor, a servo motor, or a linear motor.

7. The circuit breaker racking system of claim 1, wherein the motorized drive comprises one of a pneumatic drive motor or a hydraulic drive motor.

8. The circuit breaker racking system of claim 1, further comprising a power source for the motorized drive.

9. The circuit breaker racking system of claim 8, wherein the power source provides electrical power, wherein:
the power source comprises a remote electric power source with a cable that is temporarily connected to the drive controller; from an operator control via a control link that is temporarily connected; from a cubicle control power where a secondary control circuit disconnecting means is designed to not only provide control power to the circuit breaker in the test and connect positions, but also while the circuit breaker is in the disconnected position; from a switchgear control power; from a rechargeable or non-rechargeable battery that is temporarily connected; from a rechargeable or non-rechargeable battery that is located in the circuit breaker or the cubicle; or from power over Ethernet (PoE) via the operator control or other Ethernet network.

10. The circuit breaker racking system of claim 8, wherein the power source provides hydraulic or pneumatic power.

11. The circuit breaker racking system of claim 1, further comprising a racking position measuring device configured to provide positional information of the circuit breaker in the racking sequence.

12. The circuit breaker racking system of claim 11, wherein the racking position measuring device comprises one of a rotary digital encoder, a rotary analog potentiometer, or a rotary linear variable differential transformer (LVDT) attached to the motorized drive or other rotating components of the mechanical racking mechanism, wherein a measured angular position is related to the positions of the circuit breaker in the racking sequence.

13. The circuit breaker racking system of claim 11, wherein the racking position measuring device comprises one of a digital linear motion encoder, an analog linear motion potentiometer or an analog linear motion variable differential transformer (LVDT) physically or otherwise attached between components where the measured linear motion is related to the positions of the circuit breaker in the racking sequence.

14. The circuit breaker racking system of claim 11, wherein the racking position measuring device comprises an optical or ultrasonic sensor or sensors located to determine the positions of the circuit breaker either directly or indirectly in the racking sequence.

15. The circuit breaker racking system of claim 1, further comprising an operator control device that connects to the circuit breaker trip unit with a control link, the control link comprising a wired connection, a wireless connection, or a combination of the wired and the wireless connection.

16. The circuit breaker racking system of claim 15, wherein the control link comprises a temporary, a permanent, or a combination of a temporary and a permanent digital communications system that uses a wired or wireless connection between the operator control device and the circuit breaker racking system.

17. The circuit breaker racking system of claim 15, wherein a function of the operator control device is incorporated as part of a Supervisory Control and Data Acquisition (SCADA) system or other Human Machine Interface (HMI) system via a communication network.

18. The circuit breaker racking system of claim 1, wherein the circuit breaker trip unit or a combination of the circuit breaker trip unit and the drive controller are configured to determine one of a condition or a performance of the circuit breaker racking system.

19. The circuit breaker racking system of claim 18, wherein the determining the one of the condition or the performance of the circuit breaker racking system comprises monitoring a force required to move the circuit breaker along circuit breaker rails and a force required to seat and unseat main finger clusters from main finger clusters stabs.

20. The circuit breaker racking system of claim 19, wherein the force required to move the circuit breaker along circuit breaker rails and the force required to seat and unseat the main finger clusters from the main finger clusters stabs are operational parameters of the circuit breaker racking system, wherein the operation parameters are not directly measured but are inferred by other parameter measurements including temperatures, voltages, currents, hydraulic pressures, pneumatic pressures, torque, or flow rates.

21. The circuit breaker racking system of claim 18, wherein the drive controller or the circuit breaker trip unit includes settings for normal racking system performance values and tolerances, wherein the normal racking system performance values are predetermined based on previous racking operations or programmed by an operator.

22. The circuit breaker racking system of claim 18, wherein the monitoring system is configured to determine the one of the condition or the performance of the circuit breaker racking system further comprising out of tolerance alarms for operational performance of said circuit breaker racking system.

23. The circuit breaker racking system of claim 22, wherein the out of tolerance alarms are audibly or visually annunciated to operating personnel via at least one of operator controls, the drive controller, the circuit breaker trip unit, or are transmitted to a remote device over a communication network.

24. The circuit breaker racking system of claim 23, wherein various racking events are logged, wherein the logged racking events comprise: a racking operation type, a change in a status of the out of tolerance alarms, a lock-out operation, racking drive values, and time and date stamps, and the logging of racking events occurs in at least one device comprising the operator controls, the drive controller, or the circuit breaker trip unit, or by remote devices.

25. The circuit breaker racking system of claim 24, wherein racking events data is transmitted to at least one remote device over a communications network medium, wherein the communication network medium comprises a wired connection, a wireless RF connection, or non-RF wireless connection with a protocol appropriate to the communication network medium.

26. The circuit breaker racking system of claim 25, wherein:
the wired connection comprises a local area network or serial communication,
the wireless RF connection comprises short-range wireless communication protocol or a close proximity wireless ad hoc network communication protocol, and
the non-RF wireless connection comprises an infrared or visible light communication protocol.

27. The circuit breaker racking system of claim 25, wherein information provided to an operator and to other devices is an open or closed status of the circuit breaker which is configured to be logged and transmitted to the other devices comprising the operator control, the drive controller, the circuit breaker trip unit or to the remote devices.

28. The circuit breaker racking system of claim 22, wherein at least some of the out of tolerance alarms are adapted to be configured by an operator or programmed to automatically trigger an abortion of a racking operation or the racking of the circuit breaker to a sage position, wherein the safe position is one of a test position or the disconnected position, and wherein the multitude of positions further comprises the test position.

29. The circuit breaker racking system of claim 22, wherein the out of tolerance alarms during a racking operation are adapted to be configured by an operator or programmed to cause racking controls to enter a lock-out state is cancelled by a secured or unsecured lock-out cancel command.

* * * * *